US006250907B1

(12) United States Patent
Bergman

(10) Patent No.: US 6,250,907 B1
(45) Date of Patent: Jun. 26, 2001

(54) DEVICE FOR HOT-ISOSTATIC PRESSING OF PARTS

(75) Inventor: Carl Bergman, Västerås (SE)

(73) Assignee: Flow Holdings GmbH (SAGL), LLC (CH)

( * ) Notice: Subject to any disclaimer, the term of this patent is extended or adjusted under 35 U.S.C. 154(b) by 0 days.

(21) Appl. No.: 09/077,275

(22) PCT Filed: Nov. 29, 1996

(86) PCT No.: PCT/SE96/01568

§ 371 Date: Jul. 29, 1998

§ 102(e) Date: Jul. 29, 1998

(87) PCT Pub. No.: WO97/20652

PCT Pub. Date: Jun. 12, 1997

(30) Foreign Application Priority Data

Dec. 1, 1995 (SE) .................................................. 9504323

(51) Int. Cl.[7] .............................. B29C 43/10; B22F 3/15

(52) U.S. Cl. ......................... 425/210; 219/400; 266/254; 266/255; 425/405.2; 425/815; 432/198; 432/199

(58) Field of Search ......................... 425/78, 210, 405.2, 425/815; 432/205, 199, 198; 219/400; 266/254, 255

(56) References Cited

U.S. PATENT DOCUMENTS 3,249,964 * 5/1966 Shaler .............................. 425/405.2
3,419,935 * 1/1969 Pfeiler et al. .................... 425/405.2
3,899,821 8/1975 Ito et al. ............................ 29/420.5
4,151,400 * 4/1979 Smith, Jr. et al. ................ 425/405.2
4,217,087 * 8/1980 Bowles ............................. 425/405.2
4,349,333 * 9/1982 Bowles ................................ 432/205
4,756,680 * 7/1988 Ishii ................................. 425/405.2
4,846,675 * 7/1989 Soliman .............................. 432/206
5,123,832 * 6/1992 Bergman et al. ................. 425/405.2
5,366,563 11/1994 McKenzie ............................ 148/216

FOREIGN PATENT DOCUMENTS 2 234 451 2/1991 (GB) .
76145499 12/1976 (SE) .

* cited by examiner

*Primary Examiner*—James P. Mackey
(74) *Attorney, Agent, or Firm*—Seed Intellectual Property Law Group, PLLC

(57) ABSTRACT

A method of treating parts (34) in a treatment chamber (33) by hot-isostatic pressing with an inert gas as pressure medium and in the presence of a purifying agent **(25*a*) for the inert gas comprises the steps of reducing the pressure in the treatment chamber (33), increasing the pressure again by introducing the inert gas, increasing the temperature in the treatment chamber (33) by activating heating elements (9*a*), and, after a certain holding time, reducing the pressure and the temperature again. Especially if the purifying agent (25*a*) is of the same material as the parts (34) being treated, the purifying effect of the purifying agent becomes insufficient. The effect of the purifying agent (25*a*)** is improved according to the invention by bringing the inert gas, at least when being introduced, to circulate such that it is heated, passes through the purifying agent and is thereafter cooled before contacting the parts. The invention also relates to a device for carrying out the method.

10 Claims, 1 Drawing Sheet

DEVICE FOR HOT-ISOSTATIC PRESSING OF PARTS

INTRODUCTION

The present invention relates to a method of treating parts by hot-isostatic pressing with an inert gas as pressure medium and in the presence of a purifying agent for the inert gas. The invention also relates to a hot-isostatic press for carrying out the method.

The invention is well suited for treatment of parts where there are extremely high demands on the purity of the inert gas. The invention is particularly well suited when the parts are made of, or contain, the same material as the purifying agent for the gas.

BACKGROUND ART AND TECHNICAL PROBLEM

Hot-isostatic pressing is used, for example, for correcting defects such as cracks, pores or other voids in metallic materials. The treatment is especially valuable for removing defects in parts of expensive material, for example gas-turbine parts such as turbine blades of titanium or other so-called superalloys.

The hot-isostatic pressing is usually carried out in a pressure chamber with an inert gas as pressure medium and at a high temperature. Impurities in the gas, such as oxygen, nitrogen or water steam, have a very harmful effect on such materials as superalloys and can deteriorate the strength or toughness in a destructive manner, or form coatings which have to be removed by work operations causing material loss and high costs. To maintain the content of impurities in the inert gas low, it is known to place purifying substances in the pressure chamber for which the impurities have a greater affinity than for the parts which are to be treated. The affinity of the impurities for a substance depends partly on material properties, partly on the temperature of the substance. To increase the affinity, it is therefore possible to increase the temperature. The purifying substances may consist of aluminium, titanium or zirconium, or of alloys containing these substances. A large contact surface is desirable, and therefore the purifying substances are suitably in the form of chips, grains or powder.

Swedish patent application 7614549-9 describes one method for hot-isostatic treatment by means of an inert gas and in the presence of a purifying agent for the inert gas. According to this method, the parts which are to be treated are placed inside a container in the form of a cylinder. At the upper and lower parts of the cylinder, there are openings communicating with an annular space which is arranged between the cylinder and a cover arranged outside of this. At the top of the cylinder there is a basket with a perforated bottom. This basket accommodates the purifying agent in order to allow axial flow of the gas. During the treatment, the cylinder with the surrounding cover is placed inside a furnace arranged in a pressure chamber. To achieve pressure equalization between the spaces outside and inside the cover, the gas may pass under the lower edge of the cover.

During the treatment, heating elements in the furnace chamber are activated. The heat is transferred via the cover to the gap between the cover and the cylinder. The gas which is present in the gap is heated, causing the gas inside the cover to start circulating. During the circulation, the gas rises upwards in the gap and thereafter passes through the openings in the upper part of the cylinder and further axially down through the purifying agent in order thereafter to overflow the parts in the cylinder. At the lower part of the cylinder, the gas passes out through the openings and then again rises up through the gap.

Since the hot gas, after having passed through the purifying agent, directly overflows the parts in the container, the temperature of the purifying agent is essentially the same as that of the parts. If the purifying agent is of the same material as the parts, the impurities in the gas will therefore have the same tendency to react with the purifying agent as with the parts.

Recently, this has caused considerable problems during hot-isostatic treatment of modern materials. The aircraft industry, for example, is nowadays using to an increasing extent the very materials which are good purifying agents also as high-tensile construction materials for, for example, turbine blades. One of the very best materials from the point of view of strength is titanium. However, titanium is one of the materials which have the greatest tendency to react with the harmful gas impurities oxygen and nitrogen. During hot-isostatic treatment of titanium, therefore, it is not possible to find any purifying agent which is superior to titanium.

During treatment of titanium parts according to the method described above, the impurities in the gas therefore are equally prone to react with the parts as with the purifying agent. Since only some of the impurities in the gas react with and are bound by the purifying agent during each passage thereof, an unacceptably large part of the impurities will instead react with the parts. The result of the hot-isostatic treatment therefore becomes inferior and leads to a low yield and a high degree of rejection of parts. Still worse, however, is that the insufficient treatment may also cause faults in the material of the parts which are difficult to detect and which may cause very serious damage, for example if the treated parts constitute turbine blades for aircraft engines.

An additional problem has arisen lately as a consequence of the increasingly higher treatment pressures which are used during hot-isostatic treatment. When the gas is compressed during the pressurization, the concentration of the amount of impurities per unit of volume of gas increases. In this way, gas which exhibits acceptable impurity levels at atmospheric pressure thus becomes too laden with impurities when pressurized. This means that completely new gas of the highest purity, also when coming straight from the manufacturer, has too high an impurity level to be useful, in unpurified state, during hot-isostatic pressing. Thus, also completely new gas must be purified before coming into contact with the parts.

Still another closely related problem has arisen with the introduction of a controlled rapid cooling of the parts at the final state of the hot-isostatic treatment. Modern hot-isostatic presses, which are adapted for controlled rapid cooling, have one or more circulation loops for the gas arranged outside the furnace chamber. During the rapid cooling, a sub-flow of the gas is brought to pass through these loops for cooling by transfer of heat to the pressure chamber wall. However, it has proved that impurities, for example in the form of water and oxygen, adhere to the walls in these circulation loops. The impurities do not disappear entirely during the vacuum suction of the press but run the risk of being mixed with the gas during the treatment, thus damaging the parts.

The object of the present invention is, therefore, to provide a method and a device for hot-isostatic pressing of parts, which considerably reduces the risk of impurities present in the gas damaging the parts, especially in those cases where the parts contain the same material as the purifying agent.

THE SOLUTION

The above object is achieved according to the present invention by a method of the kind described in the introductory part of the description, which is characterized in that, during the introduction of the inert gas, the inert gas is brought to circulate in the furnace chamber, whereby the inert gas and/or the purifying agent is/are heated, the inert gas is brought to pass through the purifying agent and the inert gas, after having passed through the purifying agent, is cooled before being brought into contact with the parts in the container.

In this way, during the pressure-increasing phase, a considerable difference in temperature between the purifying agent and the parts is obtained. The purifying agent has the essentially higher temperature. The impurities present in the gas while the gas is introduced therefore have a much greater tendency to react with the purifying agent than with the parts. Impurities which do not react with and are not bound by the purifying agent during their first passage through the agent have a considerably lower likelihood of reacting with the cooler parts upon contact therewith. The result is that, even if the purifying agent and the parts are made of or contain the same material, the absolutely major part of the impurities react with the purifying agent, whereby the degree of contamination of the parts may be kept very low.

The inert gas may be brought to circulate also after termination of the introduction of the gas, that is, when the predetermined treatment pressure is achieved in the pressure chamber. This makes it possible to allow also the last quantity of gas introduced to pass through the purifying agent a plurality of times. This is particularly advantageous in those cases when the purity of the introduced gas is unacceptably low.

During the circulation of the inert gas, the gas may be heated by means of a heater especially provided therefor. The gas brings the heat to the purifying agent, whereby the tendency to reaction between the impurities and the purifying agent increases. In this way, it is possible to heat the gas without the heating elements arranged in the furnace needing activating. This is particularly advantageous, since activation of the heating elements would cause a more rapid heating of the parts, which in turn would counteract the desired temperature difference between the purifying agent and the parts. It is also possible to allow the same heater or a separate heater to directly heat the purifying agent, in which case the temperature at the reaction surfaces in the purifying agent can be further increased.

During the circulation and after the inert gas has passed through the purifying agent, the inert gas may be cooled by being passed along one or more heat-exchanging surfaces arranged in the furnace, preferably on the container. The heat-exchanging surfaces may be arranged as channel walls in longitudinal channels through the container. The channels are then arranged so as to freely communicate with the furnace chamber outside the container, while at the same time being substantially gas-tightly delimited from the interior of the container. According to the a preferred embodiment, the container may be essentially cylindrical with a vertical axis and with an essentially central cylindrical channel arranged through the container. During the circulation, the gas is led, after having passed through the purifying agent, vertically up through the central channel and further radially along the upper end member of the container, and thereafter again down along the outer shell surface of the container. The heat-exchanging surface then consists of the wall of the central channel, the upper end member, and the outer shell surface.

The embodiment entails a simple way of ensuring the circulation flow combined with a large heat-exchanging surface for the inert gas.

Further, the inert gas can be brought to circulate also in at least one circulation loop arranged outside the furnace chamber. Preferably, the gas is brought to circulate through all the spaces of the pressure chamber, outside the container. The method according to this embodiment is particularly well suited in modern hot-isostatic presses with separate cooling loops for rapid cooling of the load. By circulating the purified gas in these loops, it is possible to greatly reduce the amount of impurities there. The impurities which may, for example, consist of oxygen and water molecules and which adhere to the walls of the cooling loops, are taken up by the purified gas and brought to the purifying agent where they react with this agent and are bound thereto.

The gas exchange between the interior of the container and the surrounding furnace may be limited to allowing substantially only pressure equalization. This is done by designing the container substantially gas-tight. In this way, the gas flow which is brought into contact with the parts is minimized. This, in turn, results in the exposure of the parts to any impurities occurring in the gas being minimized. The risk that the parts are damaged by any remaining impurities is thus limited.

The invention also relates to a hot-isostatic press for carrying out the method according to the invention, described above. Its special properties and advantages will be described below in the description of the drawing.

DESCRIPTION OF THE DRAWING

Exemplifying embodiments of the method and the device according to the invention will be described below with reference to the accompanying drawing.

Figure 1:
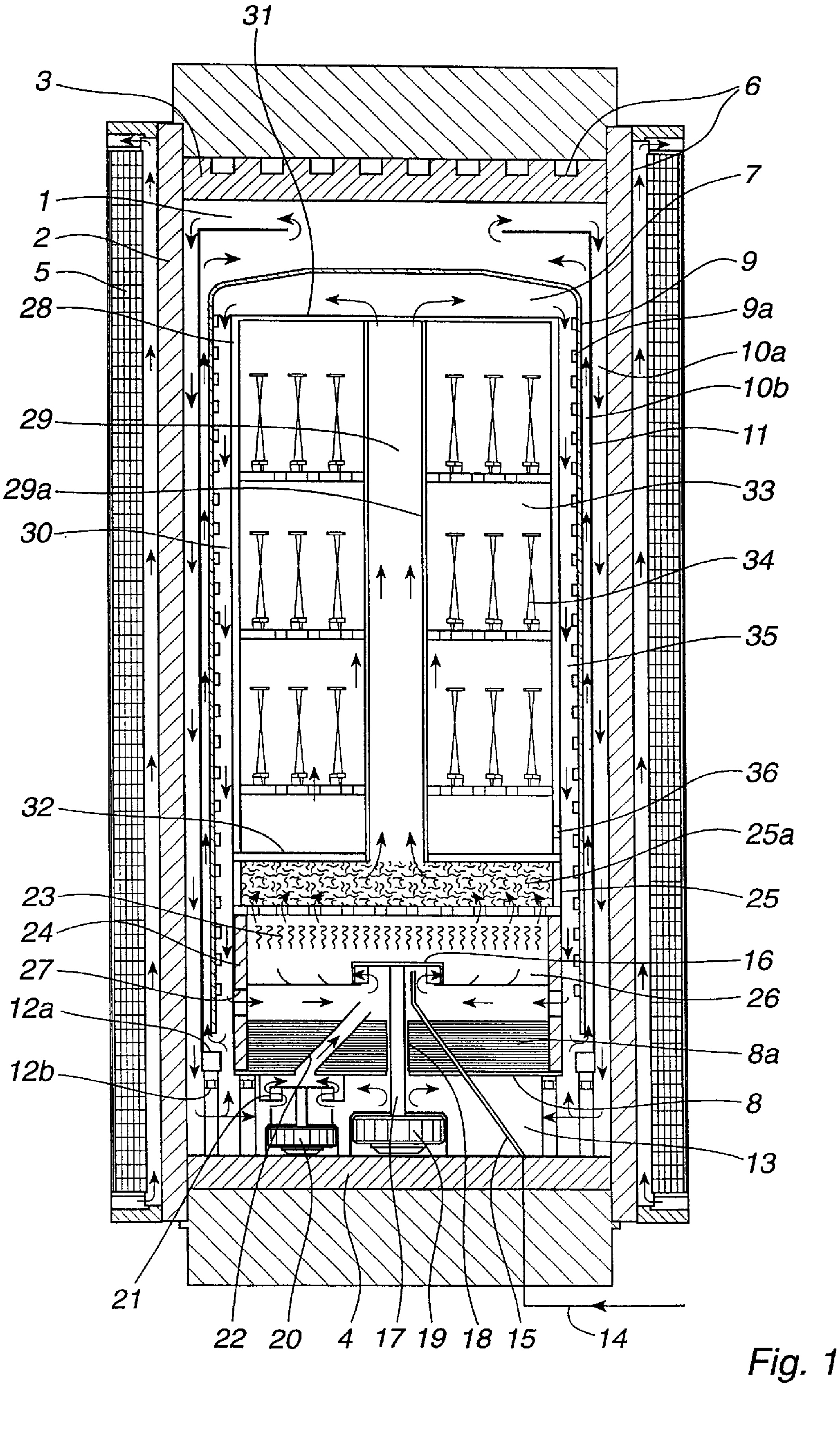
FIG. 1 of the drawing is a schematic cross section through an embodiment of a hot-isostatic press according to the invention.

The hot isostatic press shown in the FIGURE comprises a cylindrical pressure chamber 1, which is defined by a cylinder element 2 and an upper 3 and a lower 4 end closure. The cylinder element 2 is radially prestressed by means of a first wire winding 5. The pressure chamber can also be axially prestressed by means of a second wire winding (not shown). Between the cylinder element 2 and the first wire winding 5 and in the upper end closure 3, cooling channels 6 for transport of a cooling liquid are arranged. Inside the pressure chamber 1, a cylindrical furnace 7 is defined by a bottom plate 8 with insulation 8*a* and a heat-insulating shell 9. On the inside of the shell 9, a plurality of electric heating elements 9*a* are arranged. Radially outside the furnace 7, a gap 10*a, b* is arranged between the shell 9 and the cylinder element 2. In the gap 10*a, b*, a partition 11 is arranged such that the gap 10*a, b* is divided into an outer 10*a* and an inner 10*b* gap. The inner gap 10*b* communicates via an upper opening 12*a* with the furnace 7 and the outer gap 10*b* communicates via a lower opening 12*b* with a space 13 below the bottom plate 8.

Through the lower end closure 4, there extends a channel 14 for introducing the inert gas. The channel 14*a* is connected, in the pressure chamber, to a conduit 15 which extends through the bottom plate 8 and the insulation 8*a* and opens out into the lower part of the furnace 7. Immediately above the orifice of the conduit 15, a circulating fan 16, for circulation of the gas in the furnace 7, is arranged. The circulating fan 16 is driven via a shaft 17, which extends through an opening 18 in the bottom plate 8 and the insulation 8*a*, by a first electric motor 19 which is arranged in the space 13. A second electric motor 20 is arranged in the space 13 and connected to a cooling fan 21. The suction side of the cooling fan communicates with the outer gap 10*a* and its pressure side communicates via a second channel 22 with the lower part of the furnace 7.

Inside the furnace 7, above the circulating fan 16, an electric heater 23 is arranged. The heater 23 is suspended from a bottom structure 24 of annularly arranged and vertically positioned plates. On top of the bottom structure 24 rests a basket 25 with a perforated bottom. The bottom plate 8 with insulation 8*a*, bottom structure 24 and the perforated bottom of the basket 25 defines a cylindrical space 26, in which the circulating fan 16 is arranged and into which the gas pipe 15 and the channel 22 of the cooling fan open out. This cylindrical space 26 also communicates with the rest of the furnace chamber 7 via circulation openings 27. In the basket 25, on the perforated bottom, the purifying agent 25*a*, which is in the form of titanium chips, is placed. Centrally through the container 28, there runs a vertical channel 29 with a cylindrical wall 29*a*. The lower end of the channel 29 opens out immediately above the purifying agent and its upper end opens out into the upper part of the furnace, immediately below the upper end member of the shell 9. Further, the container 28 has an outer cylindrical wall 30 as well as an upper 31 and a lower 32 annular end member. The cylindrical wall 29*a* of the vertical channel 29, the upper 31 and lower 32 annular end members and the outer cylindrical wall 30 delimit an annular load space 33. This load space 33 accommodates parts 34 which are to be treated. In the example shown, the load consists of turbine blades. Between the outer wall 30 of the container and the shell 9, a circulation gap 35 is arranged. Further, the lower part of the outer wall 30 of the container is provided with a small opening 36 or one or more holes. The size of the opening 36 is adapted to allow pressure equalization between the furnace chamber 7 and the load space 33, and to prevent large gas flows in the load space 33.

The following description exemplifies a method of treating parts according to the invention. At the start of the treatment, the load is in the form of turbine blades 34 of titanium placed in the annular load space 33 inside the container 28, which is disposed in the pressure chamber 1. The pressure chamber 1 is closed. The process starts by evacuating air in the pressure chamber 1 by vacuum suction. The pressure in the pressure chamber 1 is thus decreased to about 1 mbar. Then, the inert gas argon is supplied in cold state from a gas container (not shown) arranged outside the pressure chamber 1. The gas is supplied via the gas channel 14 and the pipe 15 to the cylindrical space 26. In this way, the pressure in the pressure chamber 1 increases to about 2 bar. While introducing gas, the circulating fan 16 and the cooling fan 21 are driven such that the gas is brought to circulate in the furnace chamber 7 and in those parts of the pressure chamber 1 which are located outside the furnace 7. When the gas has circulated in the pressure chamber and the furnace for about 10 minutes, the pressure in the pressure chamber 1 is again reduced to about 1 mbar by evacuation of the gas.

After this first circulation of gas in the pressure chamber 1, a second circulation, with gas purification under heating, is carried out. Before the inert gas is again admitted, the electric heater 23 is switched on so that the gas is heated. The electric heating elements 9*a* on the inside of the shell 9 are, however, kept closed during the entire initial gas purifying phase. The inert gas is supplied from the gas container via the gas channel 14 and the pipe 15 to the cylindrical space 26. In is way, the pressure in the pressure chamber 1 increases until a pressure balance is achieved between the pressure chamber 1 and the gas container. Normally, this balance is attained at about 150 bar. Thereafter, the pressure in the pressure chamber 1 is further increased by introducing more gas by means of a pump in the form of a pressure intensifier (not shown). In this way, the pressure increases to full treatment pressure. Normally, this treatment pressure lies at about 1000 bar. During the introduction of gas, the circulating fan 16 is driven such that the gas is brought to circulate in the furnace chamber 7.

During the circulation, the gas passes from the orifice of the pipe 15 via the circulating fan 16, through the electric heater 23, where it is heated to about 1000° C.

From the heater 23, the heated gas is driven through the bed of purifying agent 25*a*, whereby the purifying agent is heated to essentially the same temperature as the gas. The purifying agent 25*a* is also heated directly from the radiation heat emitted from the heater 23. While passing through the purifying agent, impurities in the form of, for example, oxygen, water and nitrogen, react with the titanium and form solid reaction products, above all nitrides and oxides, which are bound to the titanium chips. When the gas has passed through the purifying agent 25*a*, it is led up through the central, vertical channel 29 in the container 28. From the upper orifice of the vertical channel 29, the gas is forwarded along the upper annular end member 31 and down in the annular circulation gap 35, between the outer wall 30 of the container 28 and the shell 9. During the passage through the circulation gap 35, a small part of the gas flow flows in through the small opening 36 into the load space 33. The gas flowing in through the small opening 36 is caused by the pressure difference which arises between furnace space 7 and the load space 33 when gas is introduced into the furnace chamber 7. The largest part of the gas flow through the circulation gap 35 is forwarded through the circulation openings 27 and back into the cylindrical space 26 at the suction side of the circulating fan 16. Here, the circulating gas is mixed with introduced gas from the pipe 15.

The flow of the circulating fan 16 is several times, preferably more than 10 times, larger then the flow of the gas flowing in through the pipe 15. In this way, the major part of the gas is forced repeatedly to circulate past the purifying agent 25*a* before it is brought into contact with the load 34 inside the container 28.

During the circulation, the gas is cooled when making contact with the outer surfaces of the container 28. This occurs above all in the vertical channel 29, upon contact with the inner cylindrical wall 29*a* of the channel 29. The emitted heat is transferred through the cylindrical wall 29*a* to the gas present in the load space 33, thus heating the load indirectly. Cooling of the gas is performed in a corresponding way also upon contact with the upper annular end member 31 and the outer cylindrical wall 30 of the container 28. Since the heating elements 9*a* on the inside of the shell 9 are not activated, the load 34 will be heated relatively slowly, with a certain delay. It is thus possible, for a relatively long period of time, to maintain a significant time difference between the purifying agent 25*a* and the parts 34.

Approximately simultaneously with the circulating fan 16 starting, also the cooling fan 21 starts. Part of the gas flow through the circulation gap 35 is therefore sucked out through the upper opening 12*a* in the shell 9, is led up through the inner gap 10*b*, down through the outer gap 10*a* and in through the lower opening 12*b* to the suction side of the cooling fan 21. Via the cooling fan, this sub-flow passes through the second channel 22 to the suction side of the circulating fan 16 and is mixed in the circulating fan 16 with gas circulating in the furnace 7 and with newly introduced gas. During the circulation in the cooling coil, impurities, which remain after the repeated vacuum suctions with intermediate gas circulation and which adhere to the walls, are taken up by the purified gas. These impurities are brought with the gas to the purifying agent 25*a*, where they react with the titanium and are bound thereto.

Normally, the pressure increase and the introduction of gas proceed for about 15 to 20 minutes. After the treatment pressure has been achieved, the circulating and cooling fans 16 and 21 are driven for about 40 minutes. After the second gas purifying phase has proceeded for about 45 to 60 minutes, the load may have a temperature of about 800° C. The gas purifying phase is terminated by shutting off the electric heater 23, the cooling fan 21 and possibly the circulating fan 16.

After this, the actual hot-isostatic pressing of the load begins. The pressure is maintained at about 1000 bar and the temperature in the load space is controlled with the aid of the heating elements 9*a* such that the whole load is heated to about 1000° C. With the aid of several temperature sensors (not shown) in the load space, it is possible to accurately control the temperature such that the entire load is maintained within the interval of about 1000° C.+/−5° C. to 10° C. The treatment pressure and temperature are maintained during the treatment time, which may be about 1–4 hours. Thereafter, the pressure is reduced to atmospheric pressure and the temperature is reduced by driving the circulating and cooling fans 16, 21, the heating elements 9*a* thus being shut off.

The method described above relates to hot-isostatic pressing of titanium parts with a purifying agent of titanium. It is, of course, possible to use several other purifying agents. Examples of such purifying agents are zirconium and aluminium. Often, the purifying agent is part of some alloy, for example aluminium in an iron-aluminium alloy.

Of course, also other operating parameters vary a great deal, depending on the material of the parts, the volume of the press, and the desired treatment effect. During certain treatments, it may, for example, be sufficient for the gas purifying process with a preceding vacuum suction to be carried out only once. The time for introduction and circulation of gas during the gas purifying phase may vary greatly within the interval of a few minutes to several hours.

In many applications, the temperature of the parts must not exceed the maximum treatment temperature. To ensure that this does not occur, it is, therefore, often not allowed to heat the gas, during the purifying phase, to temperatures exceeding this treatment temperature. In certain applications, however, it may be allowed to have a certain superheating of the gas during the purifying phase. The lag with which the load is heated during the cooling thus ensures that the temperature of the load does not exceed the maximum treatment temperature during the purifying phase.

To further increase the lag in the heating of the load, the surface which, during the cooling of the gas, transfers heat from the gas to the load space may be provided with some type of thermal insulation. An example of such thermal insulation may be that the vertical channel is coated with an insulating foil or that it is double-walled.

What is claimed is:

1. A hot-isostatic press comprising a pressure chamber with an inlet for an inert gas, a furnace chamber which is arranged in the pressure chamber and which is defined by an insulating shell and a plate, a container which is placed in the furnace chamber and which contains one or more parts which are to be treated, and a purifying agent through which to flow the inert gas, characterized in that a heater is arranged near the inlet at one end of the furnace chamber, the purifying agent is provided between the heater and the container, and the container comprises a passageway for the inert gas with a heat-exchanging surface such that a flow path for circulation of the inert gas is formed from the inlet, via the heater, through the purifying agent and along the heat-exchanging, surface.

2. A hot-isostatic press according to claim 1, characterized in that the container is substantially gas-tight and comprises means for pressure-equalizing gas exchange between the interior of the container and the surrounding furnace chamber and that said means, in relation to the direction of circulation, are arranged downstream of at least part of the heat-exchanging surface.

3. A hot-isostatic press according to claim 2, characterized in that the container comprises a central channel, the wall of which constitutes part of the heat-exchanging surface and the means for gas exchange between the furnace chamber and the interior of the container comprise one or more holes provided in an outer shell surface of the container.

4. A hot-isostatic press according to claim 1 characterized by means for achieving forced circulation of the gas in the furnace chamber.

5. A hot-isostatic press according to claim 1 characterized by means for achieving circulation of the gas in one or more circulation loops provided outside the furnace.

6. A hot-isostatic press, comprising a cylindrical and vertical pressure chamber with an inlet for an inert gas, a furnace chamber which is arranged in the pressure chamber and which is defined by an insulating shell and a bottom plate, a cylindrical container which is placed in the furnace chamber and which contains one or more parts which are to be treated, and a purifying agent through which to flow the inert gas, characterized in that a heater is arranged near the inlet at the lower end of the furnace chamber, the purifying agent is provided between the heater and the container and the container comprises a passageway for the inert gas with a heat-exchanging surface such that a flow path for circulation of the inert gas is formed from the inlet, via the heater through the purifying agent and along the heat-exchanging surface.

7. A hot-isostatic press according to claim 6, characterized in that the container is substantially gas-tight and comprises means for pressure-equalizing gas exchange between the interior of the container and the surrounding furnace chamber and that said means, in relation to the direction of circulation, are arranged downstream of at least part of the heat-exchanging surface.

8. A hot-isostatic press according to claim 7, characterized in that the container comprises a central cylindrical channel, the wall of which constitutes part of the heat-exchanging surface and the means for gas exchange between the furnace chamber and the interior of the container comprise one or more holes provided in an outer shell surface of the container, in the lower part thereof.

9. A hot-isostatic press according to claim 6, characterized by means, in the form of a pump or a fan, for achieving forced circulation of the gas in the furnace chamber.

10. A hot-isostatic press according to claim 6, characterized by means, in the form of a pump or a fan, for achieving circulation of the gas in one or more circulation loops provided outside the furnace.

* * * * *

UNITED STATES PATENT AND TRADEMARK OFFICE

CERTIFICATE OF CORRECTION

PATENT NO. : 6,250,907 B1
DATED : June 26, 2001
INVENTOR(S) : Carl Bergman

It is certified that error appears in the above-identified patent and that said Letters Patent is hereby corrected as shown below:

Column 8, claim 1,
Line 11, "heat-exchanging, surface." should read -- heat-exchanging surface --.

Column 8, claim 6,
Line 40, "and the container and" should read -- and the container, and --.
Lines 43 and 44, "via the heater through" should read -- via the heater, through --.

Signed and Sealed this

Fifth Day of March, 2002

*Attest:*

JAMES E. ROGAN

*Attesting Officer*

*Director of the United States Patent and Trademark Office*